United States Patent
Yamada et al.

(10) Patent No.: US 7,254,481 B2
(45) Date of Patent: Aug. 7, 2007

(54) ACTION SUPPORT METHOD AND APPARATUS

(75) Inventors: Shigeru Yamada, Kawasaki (JP); Naoki Sashida, Kawasaki (JP); Akihiko Obata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/076,237

(22) Filed: Mar. 10, 2005

(65) Prior Publication Data
US 2005/0149254 A1    Jul. 7, 2005

Related U.S. Application Data

(63) Continuation of application No. PCT/JP02/13780, filed on Dec. 27, 2002.

(51) Int. Cl.
*G01C 21/30* (2006.01)
(52) U.S. Cl. .................. 701/208; 701/209; 701/213; 701/214; 340/990; 340/991; 340/992; 340/993; 340/994; 340/988
(58) Field of Classification Search ............... 455/12.1, 455/276, 67.11; 701/208–214, 201–202; 340/990–994, 995.1, 988
See application file for complete search history.

(56) References Cited

U.S. PATENT DOCUMENTS

| | | | | |
|---|---|---|---|---|
| 4,954,958 A | * | 9/1990 | Savage et al. | 701/202 |
| 5,089,826 A | * | 2/1992 | Yano et al. | 342/457 |
| 5,187,810 A | * | 2/1993 | Yoneyama et al. | 455/509 |
| 5,220,507 A | * | 6/1993 | Kirson | 701/202 |
| 5,317,311 A | * | 5/1994 | Martell et al. | 340/905 |
| 5,365,449 A | * | 11/1994 | Kashiwazaki | 701/208 |
| 5,371,678 A | * | 12/1994 | Nomura | 701/210 |
| 5,402,117 A | * | 3/1995 | Zijderhand | 340/905 |

(Continued)

FOREIGN PATENT DOCUMENTS

| | | |
|---|---|---|
| EP | 0660289 | 6/1995 |
| EP | 0772173 | 5/1997 |
| EP | 1003017 | 5/2000 |
| JP | 2-310423 | 12/1990 |
| JP | 10-160491 | 6/1998 |
| JP | 11-142177 | 5/1999 |
| JP | 2001-012963 | 1/2001 |
| JP | 2001-264088 | 9/2001 |
| JP | 2002-092785 | 3/2002 |

OTHER PUBLICATIONS http://www.mapquest.com, MapQuest Driving Directions, 4 pages printed from the Internet.*

(Continued)

*Primary Examiner*—Cuong Nguyen
(74) *Attorney, Agent, or Firm*—Staas & Halsey LLP

(57) ABSTRACT

An action support apparatus displays a destination specification screen for specifying a destination, and receives from the user a specification of a general destination. If a general destination is specified, then the apparatus determines a detailed destination, referencing a knowledge DB. If there is a plurality of detailed destinations with respect to the general destination, then any one of them is set to the user's destination. Next, the apparatus sets the current location as the starting point, and generates a planned route from the starting point to the destination based on a map DB and an internal clock. Furthermore, the apparatus reads a filtering rule from a filtering DB, and extracts as recommended information facility information of facilities suited to the user from a facility information DB. Depending on the filtering rule, it is also acceptable to use user information in a user DB in the extraction of the recommended information. Subsequently, the apparatus associates the extracted recommended information with the planned route, and outputs them.

11 Claims, 15 Drawing Sheets

U.S. PATENT DOCUMENTS

| | | | | |
|---|---|---|---|---|
| 5,450,343 | A | * | 9/1995 | Yurimoto et al. ............ 701/208 |
| 5,452,217 | A | * | 9/1995 | Kishi et al. ................. 701/207 |
| 5,473,324 | A | * | 12/1995 | Ueno ......................... 340/990 |
| 5,523,950 | A | * | 6/1996 | Peterson .................. 455/456.5 |
| 5,539,398 | A | * | 7/1996 | Hall et al. .................. 340/907 |
| 5,539,645 | A | * | 7/1996 | Mandhyan et al. ......... 701/119 |
| 5,543,789 | A | * | 8/1996 | Behr et al. ............. 340/995.12 |
| 5,583,494 | A | | 12/1996 | Mizutani et al. ............ 340/995 |
| 5,610,821 | A | * | 3/1997 | Gazis et al. ............. 455/456.5 |
| 5,632,009 | A | * | 5/1997 | Rao et al. .................... 715/509 |
| 5,648,768 | A | * | 7/1997 | Bouve ........................ 340/988 |
| 5,689,252 | A | * | 11/1997 | Ayanoglu et al. ........... 340/991 |
| 5,802,492 | A | * | 9/1998 | DeLorme et al. ........ 455/456.5 |
| 5,818,356 | A | * | 10/1998 | Schuessler ............ 340/995.12 |
| 5,848,373 | A | * | 12/1998 | DeLorme et al. .......... 701/200 |
| 5,870,559 | A | * | 2/1999 | Leshem et al. ............. 709/224 |
| 5,884,218 | A | * | 3/1999 | Nimura et al. .............. 701/208 |
| 5,889,477 | A | * | 3/1999 | Fastenrath .................. 340/905 |
| 5,889,671 | A | * | 3/1999 | Autermann et al. .......... 700/83 |
| 5,911,773 | A | * | 6/1999 | Mutsuga et al. ............ 701/200 |
| 5,919,246 | A | * | 7/1999 | Waizmann et al. ......... 701/209 |
| 5,933,100 | A | * | 8/1999 | Golding ................ 340/995.13 |
| 5,948,040 | A | * | 9/1999 | DeLorme et al. ........... 701/201 |
| 5,958,008 | A | * | 9/1999 | Pogrebisky et al. ........ 709/223 |
| 5,974,572 | A | * | 10/1999 | Weinberg et al. ............. 714/47 |
| 6,011,494 | A | * | 1/2000 | Watanabe et al. ...... 340/995.14 |
| 6,024,655 | A | * | 2/2000 | Coffee ........................ 473/407 |
| 6,034,689 | A | * | 3/2000 | White et al. ................. 715/854 |
| 6,107,944 | A | * | 8/2000 | Behr et al. ............. 340/995.12 |
| 6,144,962 | A | * | 11/2000 | Weinberg et al. ............. 707/10 |
| 6,150,961 | A | * | 11/2000 | Alewine et al. ......... 340/995.1 |
| 6,169,515 | B1 | * | 1/2001 | Mannings et al. ........ 342/357.1 |
| 6,237,006 | B1 | * | 5/2001 | Weinberg et al. ....... 707/103 R |
| 6,253,146 | B1 | * | 6/2001 | Hanson et al. .............. 701/202 |
| 6,314,360 | B1 | * | 11/2001 | Becker ........................ 701/117 |
| 6,321,158 | B1 | * | 11/2001 | DeLorme et al. ........... 701/201 |
| 6,341,310 | B1 | * | 1/2002 | Leshem et al. ............. 709/223 |
| 6,401,029 | B1 | * | 6/2002 | Kubota et al. .............. 701/201 |
| 6,434,482 | B1 | | 8/2002 | Oshida et al. .............. 701/209 |
| 6,446,005 | B1 | * | 9/2002 | Bingeman et al. .......... 701/215 |
| 6,470,383 | B1 | * | 10/2002 | Leshem et al. ............. 709/223 |
| 6,615,130 | B2 | * | 9/2003 | Myr ............................ 701/117 |
| 6,621,494 | B2 | * | 9/2003 | Matsuoka et al. .......... 345/427 |
| 6,622,087 | B2 | * | 9/2003 | Anderson ................... 701/209 |
| 6,801,851 | B2 | * | 10/2004 | Kawakami ................. 701/209 |
| 2001/0028350 | A1 | * | 10/2001 | Matsuoka et al. .......... 345/427 |
| 2001/0029425 | A1 | * | 10/2001 | Myr ............................ 701/200 |
| 2002/0082771 | A1 | * | 6/2002 | Anderson ................... 701/209 |
| 2002/0099499 | A1 | * | 7/2002 | Takayama et al. .......... 701/200 |
| 2002/0103597 | A1 | * | 8/2002 | Takayama et al. .......... 701/200 |
| 2002/0130906 | A1 | | 9/2002 | Miyaki ....................... 345/837 |
| 2003/0040866 | A1 | * | 2/2003 | Kawakami ................. 701/209 |
| 2003/0074131 | A1 | * | 4/2003 | Barkowski et al. ......... 701/200 |
| 2003/0182052 | A1 | * | 9/2003 | DeLorme et al. ........... 701/201 |

OTHER PUBLICATIONS

Cummings et al., Collaborative Human-Computer Decision Making in Network Centric Warfare, Humans and Automation Laboratory—Massachusetts Institute of Technology, pp. 1-17.*

Funk, K. K. II et al., Agent-based pilot-vehicle interfaces: concept and prototype, IEEE Transactions on Systems, Man and Cybernetics, vol. 22, Issue 6, Nov.-Dec. 1992, pp. 1309-1322.*

S. Lu et al., Multipurpose strategic planning in the game of Go, IEEE Transactions on Pattern Analysis and Machine Intelligence, vol. 19, issue 9, Sep. 1997, pp. 1048-1051.*

R. L. Thompson et al., Providing synthetic views for teleoperation using visual pose tracking in cameras, IEEE Transactions on Systems, Man and Cybernetics, Part A, vol. 31, issue 1, Jan. 2001, pp. 43-54.*

M. White, Emerging requirements for digital maps for in-vehicle pathfinding and other assistance, Vehicle Navigation and Information Systems Conference, vol. 2, Oct. 20-23, 1991, pp. 179-184.*

R. Schleiffer, Traffic itself is simple-just analyzing it is not, Proceedings of the 33rd Annual Hawaii International, System Sciences, Jan. 4-7, 2000, vol. 2, 10 pages.*

J. B. Salway, Protecting customers traffic from the effects of EMI in computer controlled telecommunication networks, IEE Colloquium on EMC in High Integrity Digital Systems, May 17, 1991, pp. 5/1-5/5.*

European Patent Office Communication and European Search Report dated Sep. 1, 2006 for corresponding European Patent Application No. 02790931.6-2213.

European Patent Office Search Report (partial) dated Jun. 19, 2006 for corresponding European Patent Application No. 02790931.6-2213.

* cited by examiner

| GENERAL DESTINATION | DETAILED DESTINATION | COORDINATES (LATTITUDE, LONGITUDE) |
|---|---|---|
| "Rokko" | JR Kobe Line Rokkomichi Station | (34.716267, 135.236100) |
| "Rokko" | Vicinity of Mt. Rokko Post Office | (34.752936, 135.230850) |
| "Nara" | Vicinity of Kofuku Temple, Nara Park | (34.679603, 135.834461) |
| "North" | Vicinity of Osaka Station | (34.698503, 135.500922) |
| "South" | Vicinity of Shinsaibashi | (34.661353, 135.503828) |

Fig. 3

| USER ID | USER NAME | AGE | GENDER | INTERESTS | FOOD PREFERENCES | SHOPPING MEMO | BUDGET |
|---|---|---|---|---|---|---|---|
| 07051234567 | Taro Fujitsu | 30 | M | Historical landmark hunting | Japanese food | Toilet paper (supermarket) | 8,000 – 10,000 yen |
| 09031234567 | Hanako Fujitsu | 28 | F | Art | Italian cuisine | Face soap (cosmetics store) | 6,000 – 8,000 yen |
| ... | ... | ... | ... | ... | ... | ... | ... |

Fig. 4

| HEADER | PLACE | REQUIRED TIME | ATTRIBUTE INFO. | | | |
|---|---|---|---|---|---|---|
| | | | BUSINESS HOURS | HOLIDAYS | FEES | INTERESTS/PURPOSE |
| Kofuku Temple | Nara Park | 60 min. | 10:00 – 16:30 | None | 0 yen | Historical landmark hunting, appreciating art |
| Todai Temple | Nara Park | 120 min. | 10:00 – 16:30 | None | 0 yen | Historical landmark hunting, appreciating art |
| ... | ... | ... | ... | ... | ... | ... |
| Fujitsu Hat (auto parts) | Kobe | – | 9:00 – 23:00 | None | – | Auto parts |
| ... | ... | ... | ... | ... | ... | ... |
| Magi (spaghetti) | Nara Park | 45 min. | 11:00 – 22:00 | Sun. | 600 – 1,500 yen | Italian cuisine |
| Mt. Ikoma (soba noodles, udon noodles) | Mt. Ikoma | 30 min. | 11:00 – 20:00 | Sun. | 600 – 1,500 yen | Japanese food |
| Fujie (supermarket) | Nara Park | 30 min. | 9:00 – 21:00 | None | – | Supermarket |
| Fuji Cosmetics (cosmetics store) | Kobe | 5 min. | 9:00 – 21:00 | Wed. | – | Cosmetics store |
| ... | ... | ... | ... | ... | ... | ... |

Fig. 5A

| EXPLANATORY INFO. | |
|---|---|
| DETAILS | VIDEO |
| http://www.kohfukuji.com/ | — |
| http://www.todaiji.org/ | http://www.todaiji_picture1.org/ |
| ... | ... |
| http://www.fujitsu-hat.co.jp/ | http://www.fujitsu_hat.ad.co.jp/ |
| Delicious pasta dishes. Swimming crab is ... | — |
| Good reputation for homemade soba noodles | — |
| http://www.fujiei.co.jp | http://www.fujiei_map.co.jp |
| Cheaper than anywhere else | — |
| ... | ... |

Fig. 5B (FILTERING RULE) = [(1 AND 2 AND 3) OR (1 AND 3 AND 4)
OR (1 AND 2 AND 5) OR (1 AND 3 AND 6)] AND 7

Fig. 6A

| RULE ID | RULE |
|---|---|
| 1 | Positioned near the route |
| 2 | Matches interests/food preferences |
| 3 | Planned arrival time/required time within business hours |
| 4 | Vehicle trouble |
| 5 | Mealtime |
| 6 | Matches the store categories of the shopping memo |
| 7 | Total of expenses of all facilities ≦ budget |

Fig. 6B

Please input your info.
Mobile Phone
/PHS No.: 07051234567
Name: Taro Fujitsu
Age: 30
Gender: ☑ Male ☐ Female
Interests:
Food Preferences:
Shopping Memo: Store Type
Today's Budget:

Historical landmark hunting
Appreciating art
Enjoying music
Exploring new restaurants Japanese food
Western food
Italian cuisine
French cuisine Supermarket
Department store
Specialty store ▶

Cosmetics store
Fruit store
Bakery
Florist

< 6,000 yen
6,000 – 8,000 yen
8,000 – 10,000 yen
10,000 – 12,000 yen

Fig. 7

ACTION SUPPORT METHOD AND APPARATUS

This is a continuation of International Application PCT/JP2002/013780, with an international filing date of Dec. 27, 2002.

BACKGROUND OF THE INVENTION

1. Field of the Invention

The present invention relates to a system that provides information to a user moving in a vehicle and the like while in the process of moving.

2. Background Information

Car navigation systems are already installed in many personal use vehicles, and can be said to be one type of general information presentation system. A general car navigation system comprises a geographic information storage unit, a processing unit, and an interface unit. The processing unit includes a current position measuring apparatus, such as a GPS (Global Positioning System), and calculates the route. The interface unit displays a planned route calculated by the processing unit, and receives input from the user. For example, if the user inputs a destination into the system, then this system can calculate and present guidance on a route from the current position to the destination based on the information in the abovementioned storage unit, and can produce voice output of the guidance information, with intersections, and entrances and exits of highways. In addition, among car navigation systems, there are those that suggest information related to the vicinity of the current position, and that suggest the nearest restaurants and the like. Examples of vicinity information include lifestyle information useful for shopping and interests; tourist information related to scenic and historic places, special products indigenous to the locale, and the like; geographic statistical information; dictionary information; and information useful for a pleasant journey. However, a car navigation system has not been offered that presents information adapted to the various circumstances surrounding the user, such as the current time and the status of the vehicle.

In addition, if the destination is decided, then a car navigation system that presents route information up to the destination and vicinity information along the route is useful to some extent. However, for a user for whom even the destination is not yet decided, a car navigation system itself is of no assistance from the onset.

SUMMARY OF THE INVENTION

It is therefore an object of the present invention to support planning for spontaneous action by a user.

It is another object of the present invention to flexibly present a user with information suited to circumstances that change moment by moment.

It is yet another object of the present invention to present a user with map information and vicinity information when it is desired by the user, when it appears that it will be needed by the user, and the like.

To solve the abovementioned problems, the first invention of the present application provides an action support method, comprising the following steps:

a map storage step that stores map information;
a destination specification step that receives the specification of a destination by a user;
a destination determination step that determines the destination of the user based on the specified destination;
a planned route generation step that generates a planned route that links the destination of the user determined by the destination determination step, and the starting point; and
an information determination step that determines recommended information to be presented to the user based on the map information and the planned route.

According to this method, a starting point S and a destination G are decided just by a user, who is at a certain point S, specifying, for example, a general destination. Furthermore, a planned route that links both locations is generated, and the recommended information along the planned route is output. For example, let's assume that a user wants to go from Kobe to Kyoto by car, although the user has not decided where he or she would like to go in Kyoto. In this case, the user should specify "Kyoto" as the general destination. In so doing, some place in Kyoto, e.g., "Temple of the Golden Pavilion", is automatically determined as the user's destination. Subsequently, a planned route that links the "Kobe" starting point and the "Temple of the Golden Pavilion" destination is generated and output.

It is also acceptable to execute this method with a mobile computer terminal installed in the user's vehicle. In addition, it is also acceptable to execute this method with both a host terminal capable of wireless communication with the mobile computer terminal, and the mobile computer terminal. Furthermore, in addition to the mobile computer and the host terminals, it is also acceptable to execute this method by one or more computers that store the map information and recommended information candidates.

In another embodiment of the present application, the action support method further comprises a destination table step that stores a destination table. The destination table step associates a general destination and at least one specific destination that exists in the general destination. Herein, the destination specification step receives the selection of any general destination registered in the destination table. In addition, the destination determination step determines the destination of the user as any specific destination corresponding to the selected general destination.

For example, let us assume that the general destination "Kyoto" and the specific destinations "Temple of the Golden Pavilion" and "Arashiyama" are associated. If the user specifies a general destination "Kyoto," then either "Temple of the Golden Pavilion" or "Arashiyama" becomes the destination of the user.

In another embodiment of the invention of the present application, the action support method further comprises a user information storage step that accumulates user information, which is the personal information of the user. Herein, the destination determination step determines the destination of the user based on the user information.

Examples of personal information include gender, interests, food preferences, past action history, past travel history, biological information, and the like. For example, let us assume that a portion of the user information includes "interests: art." In this case, the same as previously discussed, if the user specifies a general destination of "Kyoto," then, from among "Temple of the Golden Pavilion" and "Arashiyama" associated with "Kyoto," the "Temple of the Golden Pavilion" which is suited to "art," is determined as the user's destination.

In another embodiment of the invention of the present application, the action support method further comprises:

a rule storage step that stores the information determination rule for determining the recommended information; and a facility information storage step that stores the facility information, which is information related to the facility. Herein, in addition to the map information and the planned route, the information determination step extracts from the facility information recommended information to be presented to the user based on the information determination rule and the facility information.

The following lists examples of information determination rules.

Example 1: Select recommended information that is matched to the "interests" among the user information.

Example 2: The estimated arrival time is within the business hours of the facility specified by the recommended information.

Example 3: The recommended information suited to the user's budget.

Example 4: The recommended information that conforms to the weather information.

Example 5: The recommended information that conforms to the user's biological information.

Example 6: The recommended information that conforms to the user's past action history.

Therein, the biological information is, for example, the user's chronic illness. In addition, examples of the facility information are classifications like "art" and "music", "fees", "business hours" and the like.

In another embodiment of the invention of the present application, the action support method further comprises an output step that outputs a portion or all of the recommended information associated with the planned route.

Furthermore, it is preferable that the output step outputs the time of arrival at the facility specified by the recommended information or the time that the facility is used, associated with both the recommended information and the planned route.

In another embodiment of the invention of the present application, the action support method further comprises a position specification step that receives the specification of an arbitrary position on the planned route; and a detailed information determination step that determines the recommended information in accordance with the specified position.

For example, if one point on the planned route is specified, then the coordinates for that position are computed based on the map information. Based on the map information, the recommended information that is in the vicinity of the computed position coordinates is determined.

In another embodiment of the invention of the present application, in the action support method, the position specification step receives, on a virtual route equivalent to the entire length of the planned route that links the starting point to the destination, the specification of the position of a mark that is slidable along the entire length of the virtual route. Herein, based on the relative position of the mark with respect to the virtual route, the detailed information determination step computes what location was specified on the planned route, and determines the recommended information in accordance with the computed location.

An arbitrary position on the planned route can be specified by the user sliding a mark along the virtual route. Accordingly, it is possible for the user to easily ascertain what kinds of recommended information there are throughout the entire journey.

In another embodiment of the invention of the present application, in the action support method, the position specification step further computes, in addition to the virtual route and the mark, a planned passage time when the user will pass through the location on the planned route specified by the relative position of the mark with respect to the virtual route.

If the user slides the mark along the virtual route, then the planned passage time of the location on the planned route equivalent to the position of that mark is displayed. Accordingly, it is possible for the user to easily ascertain approximately where they will pass by at what time.

Another embodiment of the invention of the present application provides a program that executes the abovementioned method, and a computer readable storage media that stores this program. Herein, examples of storage media include a computer readable/writable floppy disk, a hard disk, semiconductor memory, a CD-ROM, a DVD, a magneto-optical disc, (MO), and others.

In addition, another embodiment of the invention of the present application provides an action support apparatus comprising the following means:

a map storing means that stores the map information;

a destination specifying means that receives the specification of the destination by the user;

a destination determining means that determines the destination of the user based on the specified destination;

a planned route generating means that generates the planned route that links the destination of the user determined by the destination determining means, and the starting point; and an information determination means that determines the recommended information to be presented to the user based on the map information and the planned route.

One other embodiment of the invention of the present application provides an action support method comprising the following steps:

a slide mark display step that displays a virtual route equivalent to the entire length of the planned route that links the destination and the starting point of the user, and a mark that is slidable along the entire length of the virtual route;

a position specification step that receives the specification of the position of the mark by the user; and a recommended information output step that outputs recommended information corresponding to the location on the planned route equivalent to the relative position of the mark with respect to the virtual route.

In another embodiment of the invention of the present application, in the action support method, in addition to the virtual route equivalent to the entire length of the planned route that links the starting point to the destination, and the mark that is slidable along the entire length of the virtual route, the slide mark step further displays a planned passage time when the user will pass through the location on the planned route.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 3 is a conceptual explanatory diagram of the data accumulated in the knowledge DB depicted in FIG. 1;

FIG. 4 is a conceptual explanatory diagram of the data accumulated in the user DB depicted in FIG. 1;

FIG. 5 is a conceptual explanatory diagram of the data accumulated in the facility information DB depicted in FIG. 1;

FIG. 6 is a conceptual explanatory diagram of the data accumulated in the filtering DB depicted in FIG. 1;

FIG. 7 is one example of a user information input screen output by the action support apparatus depicted in FIG. 1;

DETAILED DESCRIPTION OF THE PREFERRED EMBODIMENTS

First Embodiment (1) General Overview

Figure 1:
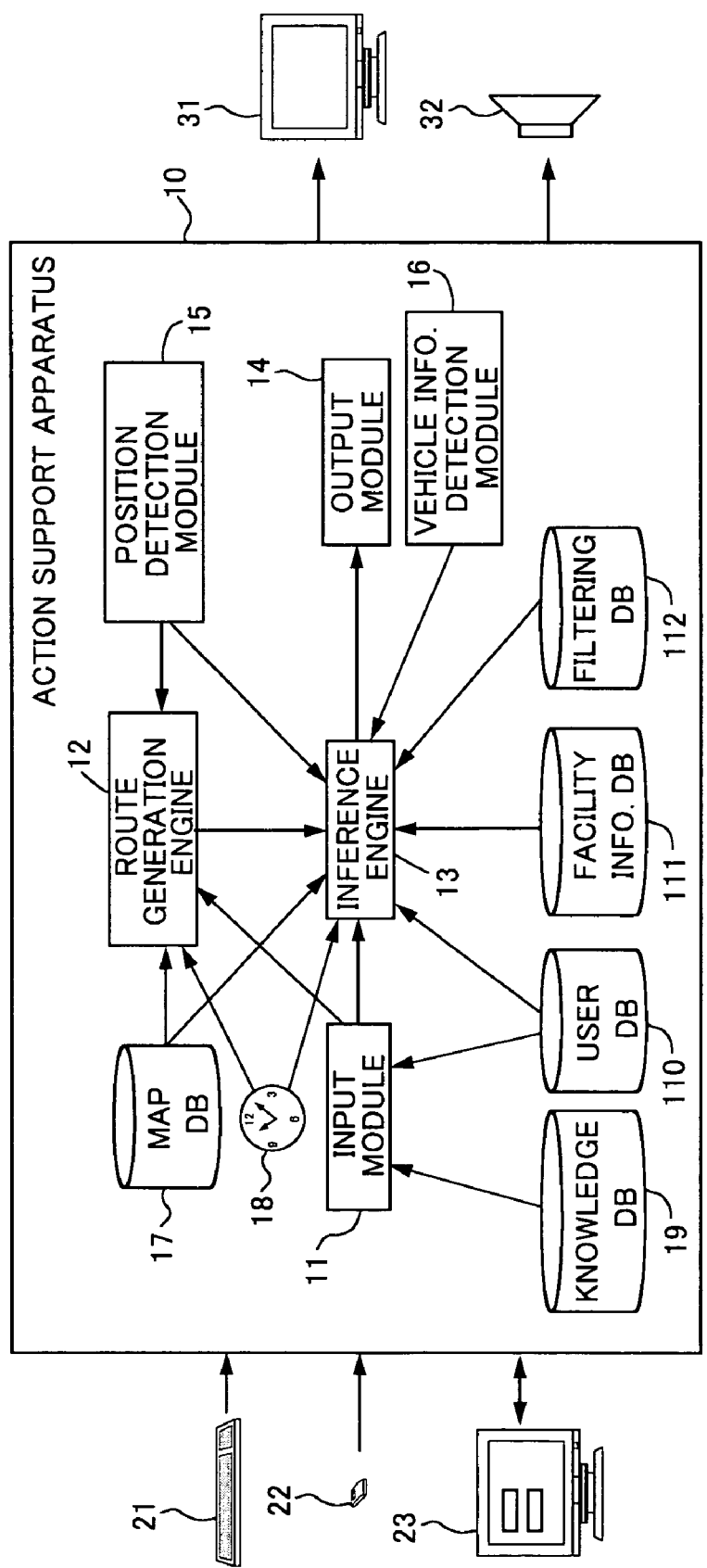
FIG. 1 is a block diagram of the action support apparatus according to the first embodiment of the present invention.

FIG. 1 depicts the functional constitution of the action support apparatus according to the first embodiment of the present invention. An action support apparatus 10 is implemented using a computer installed, for example, in a vehicle that travels. An input means and an output means are connected to the action support apparatus 10, and the input and output of image data, text data, voice data, and the like are respectively performed from the input means and to the output means. Examples of input means include a keyboard 21, a mouse 22, a touch screen display 23, and a microphone (not shown). Examples of output means include a touch screen display 31, a speaker 32, and the like. To facilitate explanation, the following raises an example of a case wherein a touch screen 23 is used as the input means and the output means.

The action support apparatus 10 comprises a module group and a database (DB) group. In this example, the module group of the action support apparatus 10 includes the following (a)-(g).

(a) Input module 11: Receives data input by the user operating the action support apparatus 10, and determines the destination.

(b) Route generation engine 12: Generates the planned route that links the starting point and the destination.

(c) Inference engine 13: From among the information that exists along the planned route (hereinafter, referred to as the vicinity information), analogically infers the vicinity information suited to the user and to the circumstances of the user (hereinafter, referred to as the recommended information).

(d) Output module 14: Outputs to the output means image data associated with the planned route and the recommended information.

(e) Position detection module 15: Detects the position of the action support apparatus 10.

(f) Vehicle information detection module 16: Detects errors generated by the moving vehicle on which the action support apparatus 10 is installed.

(g) Internal clock 18: The internal clock of the computer wherein the action support apparatus 10 is installed.

In addition, the database (DB) group of the action support apparatus 10 includes the following (a)-(e).

(a) Map DB 17: Accumulates position information, such as roads, railroad tracks, and various facilities.

(b) Knowledge DB 19: Associates and stores the general destinations and the detailed destinations.

(c) User DB 110: Accumulates the user's personal information.

(d) Facility information DB 111: Accumulates information related to various facilities.

(e) Filtering DB 112: Accumulates a filtering rule for extracting recommended information from the facility information DB 111.

Figure 2:
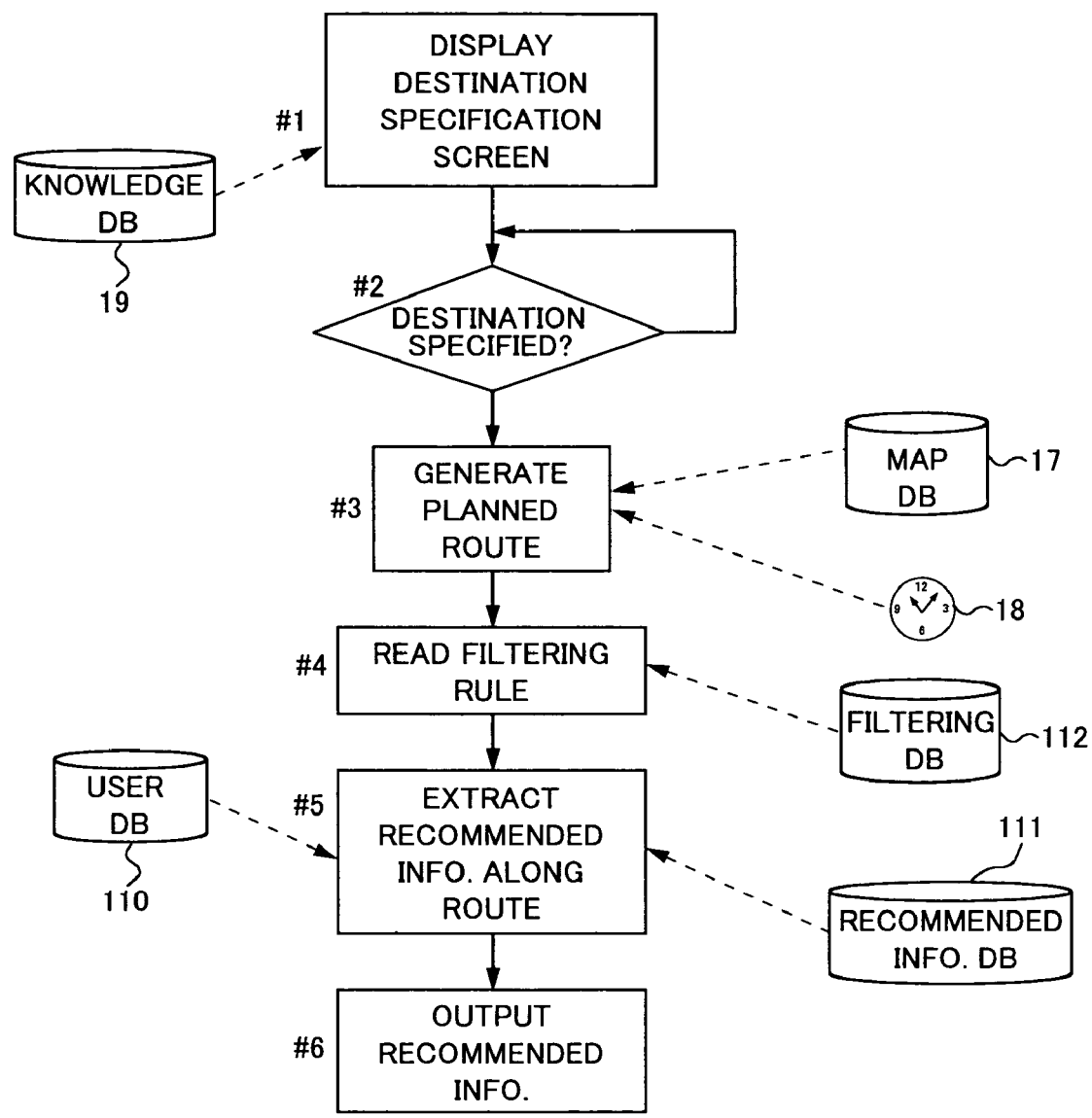
FIG. 2 is an explanatory diagram that depicts the basic processing flow performed by the action support apparatus in FIG. 1.

FIG. 2 is an explanatory diagram of the basic operation performed by the action support apparatus 10 depicted in FIG. 1. The action support apparatus 10 displays the destination specification screen for specifying the destination (#1), and receives the specification of the general destination from the user (#2). When the general destination is specified, the action support apparatus 10 determines the detailed destination, referencing the knowledge DB 19. If there is a plurality of detailed destinations with respect to the general destination, then any one of them is made the user's destination.

Next, based on the map DB 17 and the internal clock 18, the action support apparatus 10 generates, using the current position as the starting point, the planned route from the starting point to the destination (#3). Furthermore, the action support apparatus 10 reads the filtering rule from the filtering DB 112 (#4), and extracts, as the recommended information, the facility information of the facility suited to the user from the facility information DB 111 (#5). Depending on the filtering rule, the user information in the user DB 110 may also be used to extract the recommended information. Subsequently, the action support apparatus 10 associates the extracted recommended information with the planned route, and outputs them (#6).

(2) Databases

The following describes specific examples for the various databases in the action support apparatus 10 depicted in FIG. 1.

FIG. 3 is a conceptual explanatory diagram of the knowledge information accumulated in the knowledge DB 19. In this example, the "general destinations," the "detailed destinations," and the "position information" of the detailed destinations are associated and stored as the knowledge information. The "general destinations" are stored by the action support apparatus 10 in order to have the user select any one of them. If there is only one detailed destination corresponding to the selected general destination, then that detailed destination becomes the user's destination. If there are two or more detailed destinations corresponding to the general destination, then any one of the detailed destinations is selected as the user destination. An example of a selection method is one that selects any one of the detailed destinations suited to the user based on the user information, which is discussed later. Of course, it is also acceptable to have the user select any one of the detailed destinations, and then to make the selected detailed destination the user's destination. Accordingly, the "general destination" is set so that the user can specify generally where they want to go without deciding a specific action. In other words, the "general destination" is set so that it points to a comparatively wide geographical scope. In addition, the "detailed destination" is set so that it forms a more specific location that exists within the geographical scope of the corresponding general destination. The position information that indicates the "detailed destination" can be represented by longitude and latitude, e.g., using GPS coordinates.

FIG. 4 is a conceptual explanatory diagram of the user information accumulated in the user DB 110. The user DB 110 stores the user information for at least one user. The user information includes, for example, a user ID specified by the user, and various types of personal information. The user's mobile telephone number or PHS number can be used for the user ID. Of course, it is also additionally acceptable for the action support apparatus 10 to use arbitrary information for specifying the user, e.g., a serial number. In this example, personal information includes the "user name," "age," "gender," "interests," "food preferences" that indicate foods that the user likes, a "shopping memo" that records items that the user is thinking of buying, and a "budget." The "shopping memo" also stores the types of stores where the user buys the products they are thinking of buying. The various items of the personal information can be used in filtering for setting the recommended information presented to the user to those things suited to that user.

FIG. 5 is a conceptual explanatory diagram of the facility information accumulated in the facility information DB 111. The facility information includes information related to various facilities, such as stores, restaurants, and amusement centers. In this example, the facility information includes "header," "place," "required time," "attribute information" and "explanatory information." The "header" is text information or image information presented to the user. Every header is set so that, when the user sees the header, they generally understand what type of facility it is. The "place" is any one of the detailed destinations accumulated in the abovementioned knowledge DB 19. The "required time" indicates the average time needed at each facility.

The "attribute information" includes information related to each facility. In this example, the attribute information includes the "business hours," "holidays," "fees" and "interests/purpose." For example, by including the "business hours" in the attribute information, it becomes possible to judge whether the estimated arrival time at that facility and the required time fall within the business hours. This applies likewise for the "holidays." If the filtering rule for extracting the recommended information includes budget limitations, then it is preferable that the attribute information includes the "fees." The "interests/purpose" includes the purpose of each facility, the anticipated food preferences of people who visit each facility, the anticipated interests of people who visit each facility, and the like. It becomes possible to extract the recommended information based on the interests, food preferences, and the shopping memo of each user accumulated in the user DB 110.

The explanatory information includes, for example, a detailed explanation of each facility, image information of each facility, and the like. For example, if the user's destination is Nara Park and the user selects Kofiku Temple, which is one of the facilities in Nara Park, then it is acceptable to display the home page of Kofuku Temple. It is also acceptable if the explanatory information is a URL (Uniform Resource Locator) that points to detailed information for each facility, or a file name. In addition, the explanatory information may also be a text file or an image file itself that explains each facility.

FIG. 6 is a conceptual explanatory diagram of the filtering rule accumulated in the filtering DB 112. The filtering DB 112 stores a plurality of rules, and a filtering rule that links and defines all the rules using AND and OR. Each rule is set so that recommended information suited to the likes of the user and recommended information that anticipates the action of the user, and the like, can be extracted. In this example, seven rules are set. Each rule will be specifically explained.

(a) Rule 1 "positioned near the route": Means that the facility to be recommended must be positioned along the generated planned route.

(b) Rule 2 "matches interests/food preferences": Means that the facility information of the facility to be recommended must include any one of the user's interests or food preferences.

(c) Rule 3 "estimated arrival time/required time is within business hours": Means that, if the user acts along the planned route, then the estimated arrival time to each facility and the time passed therein must fall within the business hours of that facility.

(d) Rule 4 "vehicle trouble": Means that, if a vehicle fault, e.g., a blown head lamp occurs, then the facility information of an auto parts dealer will be presented as the recommended information.

(e) Rule 5 "mealtime": Means that, if mealtime is approaching, then the facility information of restaurants along the planned route is presented as the recommended information.

(f) Rule 6 "matches the store categories of the shopping memo": Means that the facility information of the facilities to be recommended must include any one of the types of stores that are stored in the user shopping memo.

(g) Rule 7 "total expenses of each facility is within budget": Means that, if the user has limited the budget, then the recommended information is extracted so that the total of the fees of each facility will fall within the budget if the user acts along the planned route.

(3) Modules

The following provides a specific explanation of the function of each module.

Input Module

The input module 11 receives input and updates of the user information from the touch screen display 23 and the like, and stores the received information in the user DB 110. FIG. 7 is one example of the user information input screen wherein the input module 11 receives input. This screen receives the input of new user information, and the updates of previously inputted user information. The inputted items correspond to the items included in the user information in the abovementioned user DB 110. The "interests," "food preferences," "store type," "today's budget" and the like are selected from a drop-down list. If the recommended information is extracted using this user information, as previously discussed, then it is preferable that this information is inputted by selecting from a fixed selection of choices rather than being freely inputted by the user. Furthermore, the "shopping memo" and the "store type" on this screen are associated and stored as items in the shopping memo of the user information.

Figure 8:
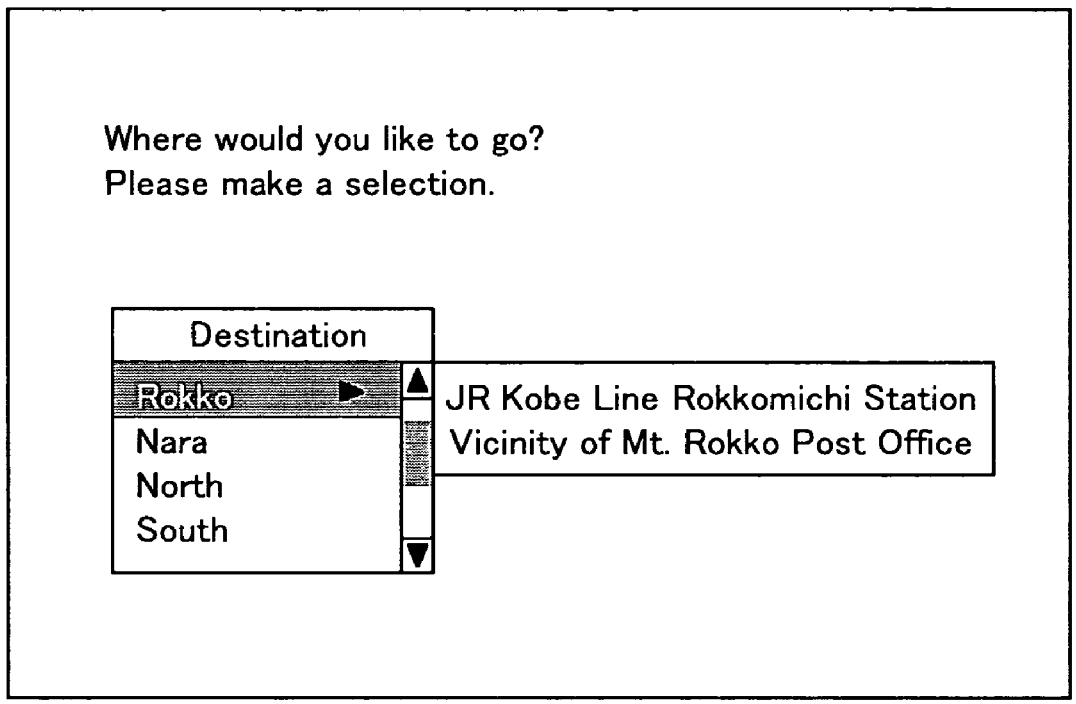
FIG. 8 is one example of a destination specification screen output by the action support apparatus depicted in FIG. 1.

In addition, the input module 11 receives the input of the general destination from the user. FIG. 8 is a destination specification screen wherein the input module 11 receives input. In this screen, a list of general destinations accumulated in the knowledge DB 19 is displayed. If the user selects any one of the general destinations, then the detailed destinations corresponding thereto are read from the knowledge DB 19. If there is only one detailed destination corresponding to the selected general destination, then that can be made the user's destination. If a plurality of detailed destinations is associated, then the input module 11 selects any one of them as the user's destination. An example of a selection method is one that selects a destination having numerous facilities suited to the "interests" in the user information. In addition, if, for example, "today's budget" is included in the user information, then it is acceptable to select a destination that the user can go to within that budget. Furthermore, although not shown in the figure, if, for example, the period and time are specified in the user information, then it is acceptable to select a destination that the user can go to within the specified period and time.

Furthermore, it is also acceptable that the input module 11 receive the selection of any one of the detailed destinations from the list of detailed destinations corresponding to the general destination specified by the user, as depicted in FIG. 8. The destination can be simply specified by the user specifying any one of the detailed destinations on the screen. In addition, it is also acceptable that the input module 11 receives just the selection of any one of the detailed destinations among the detailed destinations corresponding to the specified detailed destination, e.g., from among the detailed destinations selected based on the user information. Specifically, if the user information includes "today's budget," then only the selection of a detailed destination that the user can go to within that budget can be received. In addition, although not shown in the figure, if, for example, the period and time are specified in the user information, then it is also acceptable to receive only the selection of a detailed destination that the user can go to within the specified period and time.

Route Generation Engine

The route generation engine 12 sets the starting point to the position of the action support apparatus 10 at the time that the destination is specified, and, based on the map information accumulated in the map DB 17, generates a planned route that links the starting point and the destination. The position information of the starting point is acquired from the position detection module 15. The position information of the destination is registered in the knowledge DB 19. The planned route includes the position information related to all points on that route, and the planned passage time for each point. The generated planned route is supplied to the inference engine 13. The map information together with the computer internal clock 18 are used in computing the planned passage time for each store.

Figure 9:
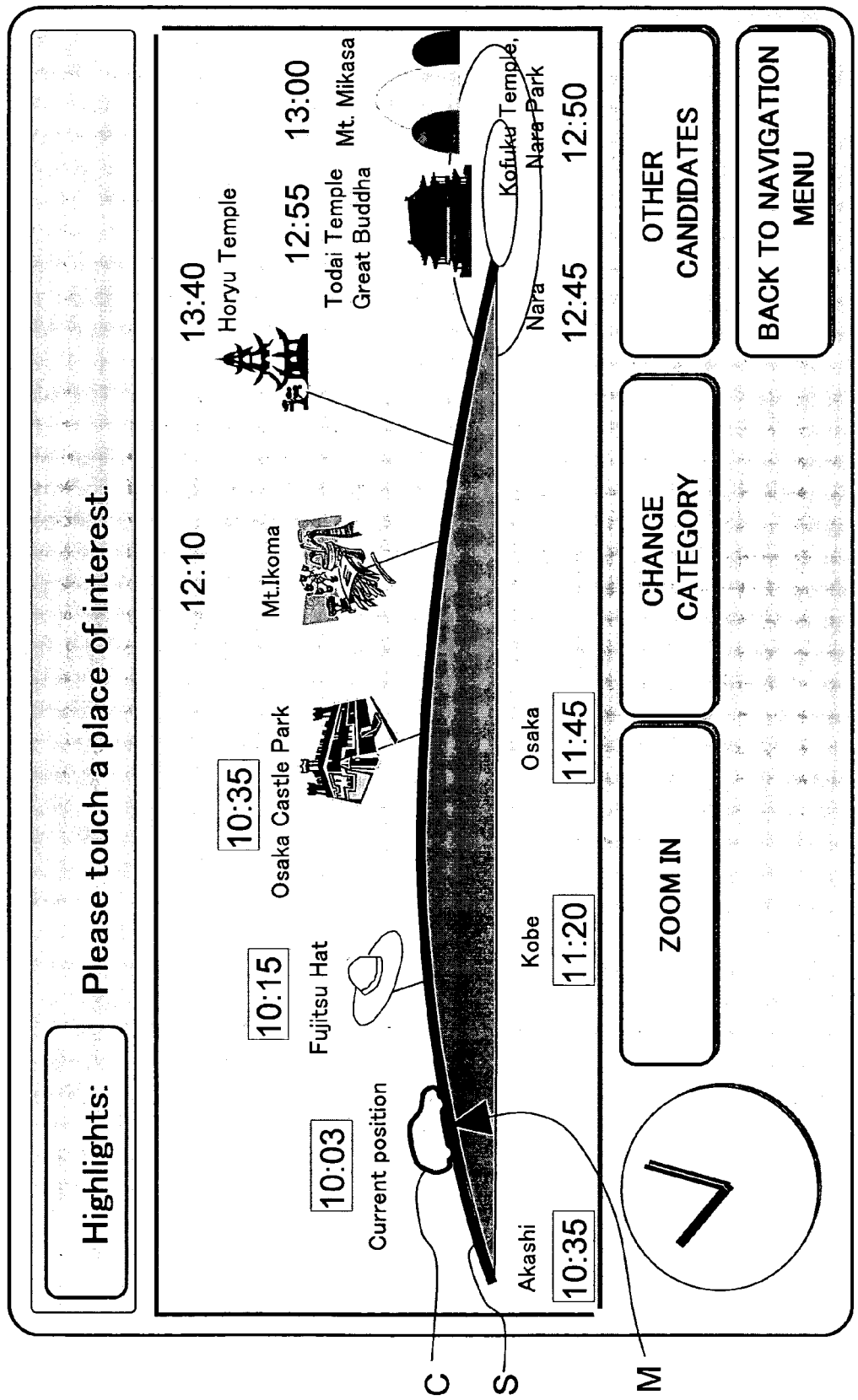
FIG. 9 is one example of a recommended information display screen output by the action support apparatus depicted in FIG. 1.

Inference Engine (a) Associating the Planned Route, the Recommended Information, and the Current Position The inference engine 13 extracts from the facility information DB 111 the facility information, as the recommended information, of the facilities suited to the user (hereinafter, referred to as the recommended facilities) from among the facilities that exist along the planned route generated by the route generation engine 12. In addition, the inference engine 13 associates the planned route and the recommended information, and supplies them to the output module 14. Specifically, the inference engine 13 acquires the position information of the recommended facilities from the map DB 17, and associates the planned route and the recommended information. FIG. 9 is an example of a display of the planned route and the recommended information that have been associated by the inference engine 13. In this screen, the "headers" from among the recommended information are displayed along a virtual route S (slider). The virtual route S indicates the entire length of the distance of the planned route, and the total time anticipated to be needed to travel the planned route. To facilitate the explanation, the following raises an example of a case wherein the virtual route S indicates the entire length of the distance of the planned route. In this case, the relative position of each "header" with respect to the virtual route S is associated with the relative position of each recommended facility with respect to the planned route. In addition to the "header," it is also acceptable to display the planned passage time at which time the user will pass by each recommended facility. In addition, the inference engine 13 calculates, based on the position of the action support apparatus 10 advancing along the planned route, the position of the current position, which gradually moves on the virtual route S from the starting point side to the destination side. The current position is indicated by the car-shaped marker C in the figure. The position of the car-shaped marker C is updated, e.g., at a fixed cycle, as the vehicle on which the action support apparatus 10 is installed travels.

(b) Filtering of Recommended Information

The recommended information is extracted from the facility information DB 111 based on the filtering rule accumulated in the filtering DB 112. The inference engine 13 extracts the information needed to extract the recommended information, e.g., from the user DB 110, and selectively extracts the recommended information based on the extracted user information. Depending on the filtering rule, the inference engine 13 extracts the recommended information based on information other than that information stored in the database. For example, if the vehicle information detection module 16 has detected that a headlight has blown or that there is only a small amount of gasoline left, then the inference engine 13 extracts from the facility information DB 111 the facility information of auto parts stores and gas stations that are positioned near the planned route.

(c) Recommended Information to be Displayed

Furthermore, if numerous recommended facilities exist along the planned route, then it is also acceptable that the inference engine 13 selects the recommended information of some recommended facilities to be displayed. It is also possible to switch the facilities to be displayed by, for example, category. The screen in FIG. 9 is provided with a "CHANGE CATEGORY button" that receives the switching of the category to be displayed. Examples of categories include "dining (noodles)," "dining (French cuisine)," "museum" and "tea."

Figure 10:
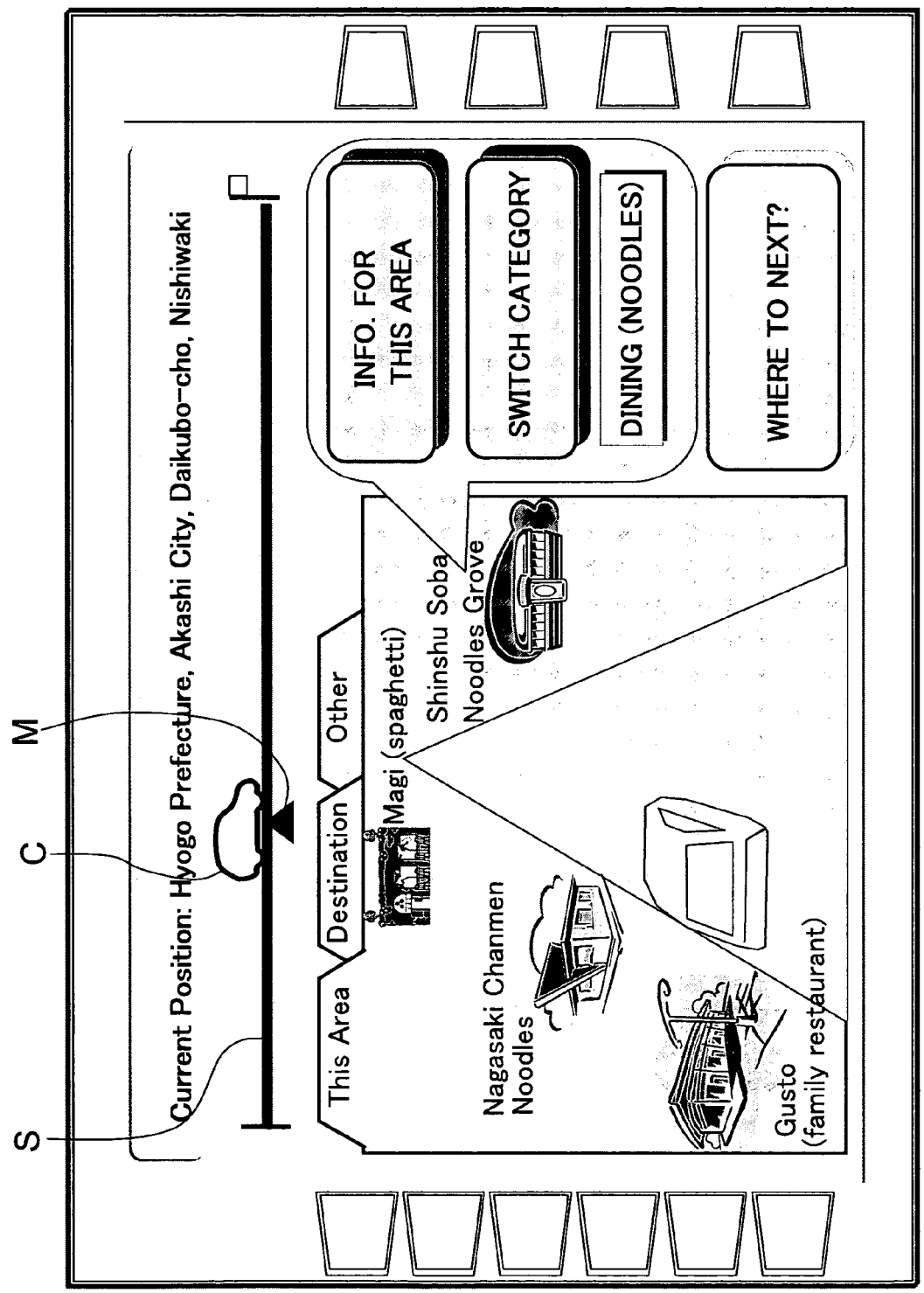
FIG. 10 is another example of a recommended information display screen output by the action support apparatus depicted in FIG. 1.

In addition, it is also acceptable for the inference engine 13 to display the facility information of the recommended facilities, among the recommendation information, in the vicinity of the specified place. FIG. 10 depicts another example of a display screen of the planned route and the recommended information. This screen receives the specification of "this area," "destination" and "other" as the place specification. In this figure, the headers of the facilities suited to "dining (noodles)" among the recommended facilities of "this area" are displayed as the recommended information.

(d) Detailed Display of the Recommended Information

In addition, the inference engine 13 can also receive a request to view the recommended information of the recommended facilities in more detail. For example, if the "ZOOM IN button" depicted in the screen in FIG. 9 is pressed, then it is acceptable to display the attribute information and the explanatory information from among the recommended information of the recommended facilities closest to the current position. If the selection of recommended information is received and the "ZOOM IN button" is pressed, then it is also acceptable to output the explanatory information of the selected recommended information. Furthermore, as a result of viewing the attribute information, explanatory information and the like of a certain recommended facility, it is also acceptable that the inference engine 13 receives, by an "other candidate button" and the like depicted in the screen in FIG. 9, a request to find out more detailed information on yet other recommended facilities. If this button is pressed, then the attribute information and the explanatory information are displayed for the other recommended facilities in the vicinity of the current position.

(e) Updating the Planned Route

The inference engine 13 can add at least one among the displayed recommended information to a new destination. For example, if any one of the displayed headers is selected on the touch screen 23 as the recommended information, then the inference engine 13 adds to the new destination the facility corresponding to the selected recommended information. Furthermore, the inference engine 13 has the route generation engine 12 generate a new planned route that passes through the new destination. Based on the new planned route, new recommended information is extracted and associated with the planned route.

(f) Specification of an Arbitrary Location/Time on the Planned Route

Figure 11:
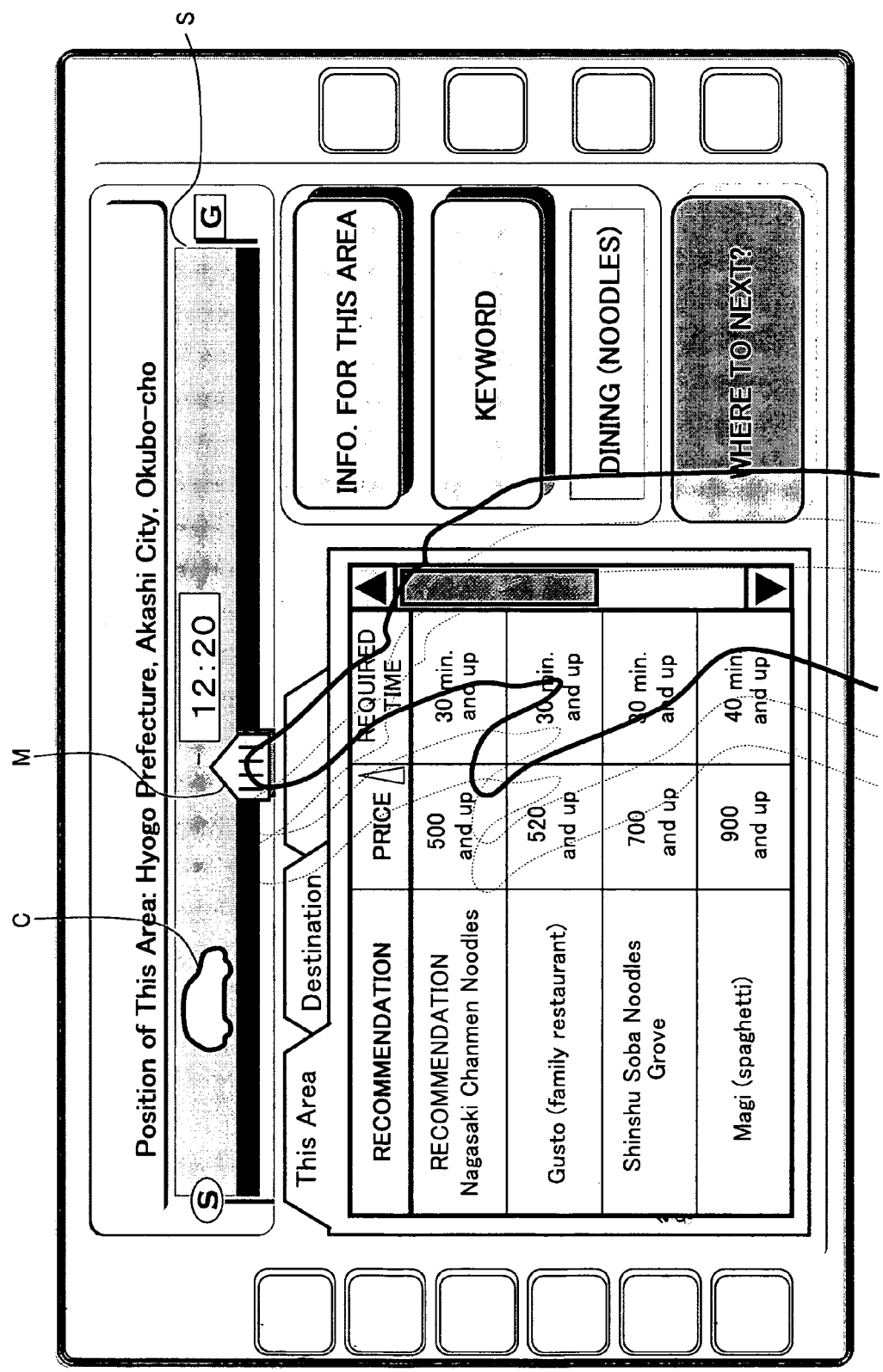
FIG. 11 is another example of a recommended information display screen output by the action support apparatus depicted in FIG. 1.

In addition to the previously discussed functions, it is preferable that the inference engine 13 generate a slidable marker M on the virtual route S, and receive changes in the position of the marker M. Namely, the user can slide the marker M to an arbitrary position along the virtual route S. It is also acceptable for the inference engine 13 to convert the relative position of the marker M with respect to the virtual route S to the actual position information on the planned route, calculate approximately what time the user will pass that location, and display that time along with the marker M. Furthermore, the inference engine 13 should extract from the facility information DB 111 the facility information of the recommended facilities in the vicinity of the location specified by the marker M (hereinbelow, referred to simply as the vicinity recommended information), based on the computed position information. In the example of FIG. 11, the user has moved the marker M as far as the middle of the virtual route S. The time when the user will pass through the location on the planned route corresponding to that position is "12:20." In addition, among the vicinity recommended information of that location, "Nagasaki Chanmen Noodles," "Gusto (family restaurant)," "Shinshu Soba" and "Magi (spaghetti)" are displayed as ones belonging to the "dining (noodles)" category.

Output Module

The output module 14 generates the graphics data for each screen illustrated in FIG. 7 through FIG. 11, and displays each of the previously discussed screens on the touch screen display 23 or the display 31. In addition, the output module 14 outputs speech to the speaker 32 as needed.

Specifically, the output module 14 displays the user information input screen and the destination specification screen illustrated in the abovementioned FIG. 7 and FIG. 8. In the destination specification screen of FIG. 8, it is acceptable that the output module 14 displays a list of detailed destinations corresponding to the general destination specified by the user. In addition, it is acceptable that the output module 14 displays, from among the detailed destinations corresponding to the specified general destination, a list of just the selected detailed destinations based on, for example, the user information. Specifically, if the user information includes "today's budget," then just a list of the detailed destinations that the user can go to within that budget can be displayed. In addition, although not illustrated, if, for example, the period and time are specified in the user information, then it is also acceptable to display a list of just the detailed destinations that the user can go to within the specified period and time.

FIG. 9 is one example of a recommended information display screen outputted by the output module 14. The output module 14 generates graphics data that indicates the positional relationship between the planned route calculated by the inference engine 13, the recommended facility and the current position, and outputs that to the touch screen 23 and the like. In this figure, the recommended information is associated with respect to the entire virtual route S, and displayed.

FIG. 10 depicts another example of a recommended information display screen outputted by the output module 14. As can be understood from this figure, the mode of the display of the virtual route S, the recommended information, and the current position C is not particularly limited. They should be displayed so that the relative positions of the recommended facilities and the current position C with respect to the planned route can be generally understood. In this figure, the current position C is at a location where it has progressed approximately ⅓ of the entire journey from the starting point. In addition, the vicinity recommended information of the current position is displayed. All recommended information is displayed according to the distance from the current position, and the display mode is not limited thereto.

FIG. 11 depicts yet another example of a recommended information display screen outputted by the output module 14. In this figure, the current position C is at a location where it has progressed approximately ⅓ of the entire journey from the starting point. In addition, a portion of the vicinity recommended information of the location on the planned route specified by the marker M is displayed. The recommended information is displayed in this example in the order of lowest price, but the display mode and the display order are not limited thereto.

Position Detection Module

The position detection module 15 detects the position of the vehicle on which the action support apparatus 10 is installed. The position detection module 15 can be implemented using, for example, a GPS.

Vehicle Information Detection Module

The vehicle information detection module 16 detects whether there is a fault in the vehicle on which the action support apparatus 10 is installed. For example, it detects whether there is a blown head lamp, the amount of gasoline remaining, the water temperature of the radiator, and so on. This information can be acquired from the CPU that controls the vehicle.

(4) Processing Flow

Main Processing

Figure 12:
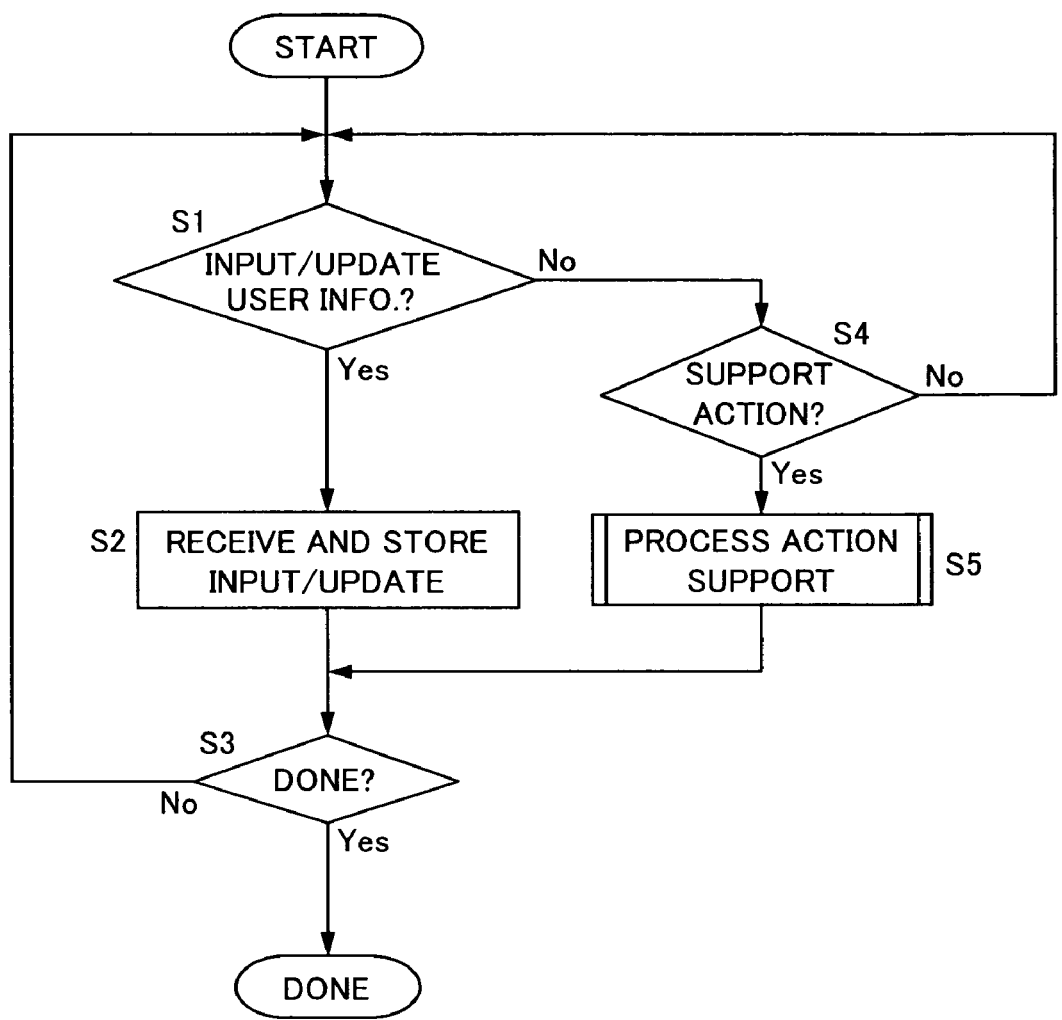
FIG. 12 is a flow chart that depicts one example of the main processing flow executed by the action support apparatus depicted in FIG. 1.

FIG. 12 is a flow chart that depicts the flow of the main processing performed by the action support apparatus 10 depicted in FIG. 1. For example, the main processing starts with turning on the power to the computer that the action support apparatus 10 operates, and ends with turning off the power.

Step S1: The action support apparatus 10 judges whether a user information input/update should be performed, or whether action support processing should be performed. This judgment is performed by, for example, displaying a menu screen over a menu screen (not shown), and receiving any selection by the menu screen.

Step S2: If user information input/update is selected, then the action support apparatus 10 receives the input or the update of the user information by the input module 11, and registers the received user information in the user DB 110.

Step S3: The action support apparatus 10 judges whether main processing is done. If it judges "No," then processing returns to step S2, and the identical processing is repeated. If it judges "Yes," then processing terminates.

Steps S4, S5: If action support processing is selected by the abovementioned menu screen, then the action support apparatus 10 executes the action support processing, discussed later. Subsequently, processing transitions to step S3, and the previously mentioned processing is repeated until main processing terminates.

In so doing, the action support apparatus 10 operates so that it accepts the input or update of the user information, or performs by the action support processing performing any of the processes that support the user's actions.

Action Support Processing

Figure 13:
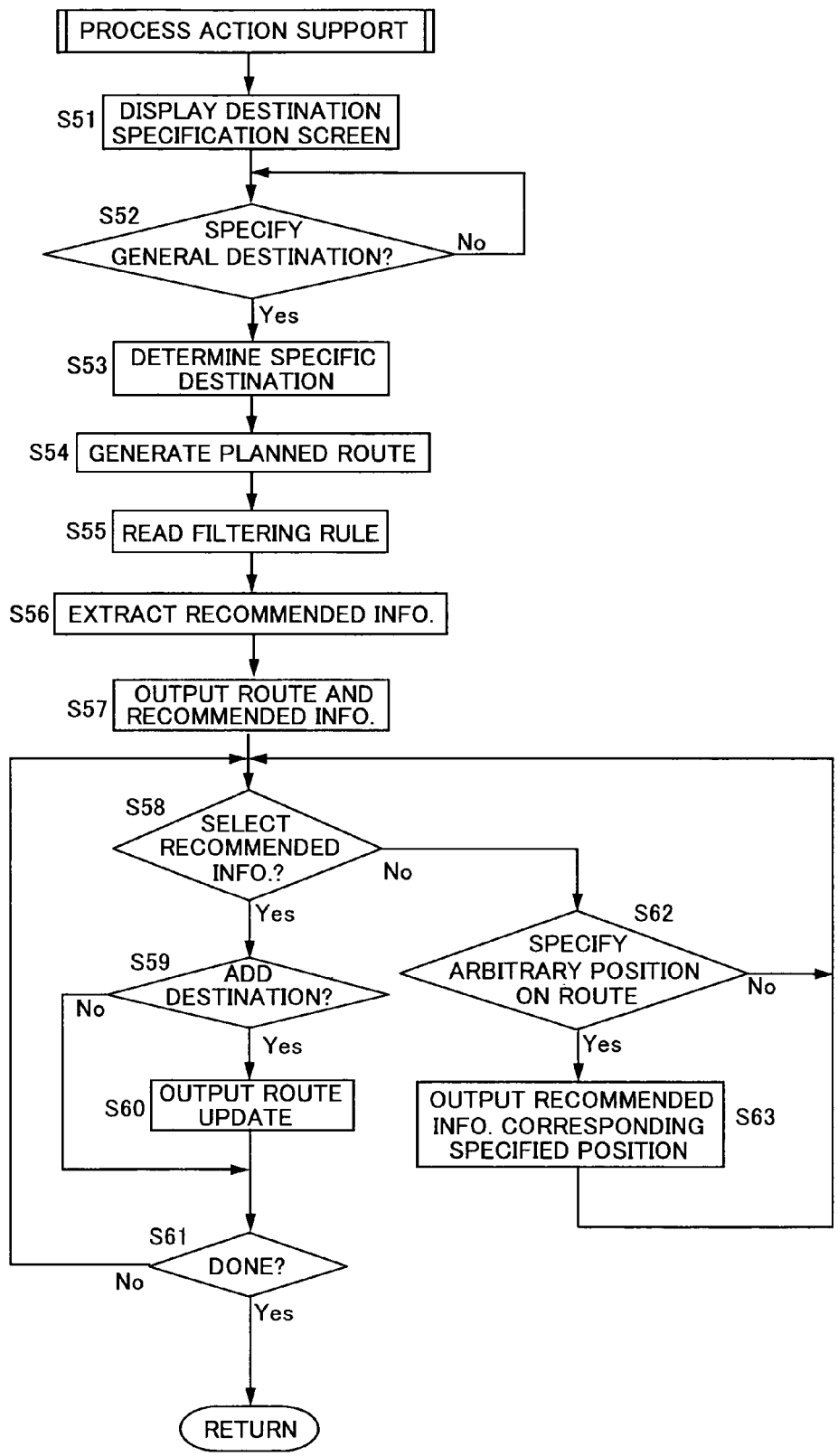
FIG. 13 is a flow chart that depicts one example of the flow of the action support processing executed by the action support apparatus depicted in FIG. 1.

FIG. 13 is a flow chart that depicts one example of the flow of the action support processing. The action support processing starts if the previously mentioned main processing transitions to step S5. This processing supports the determination of the user's action plan.

Step S51: The action support apparatus 10 outputs the destination specification screen by the output module 14.

Step S52: The action support apparatus 10 stands by for a destination to be specified, by the input module 11, on the destination specification screen, and transitions to step S53 if a general destination is specified. Furthermore, to facilitate explanation, this example describes a case wherein a detailed destination is determined from a specified general destination. In addition to this example, it is also acceptable that the action support apparatus 10 receives the specification of the detailed destination without having, for example, the specification of a general destination.

Step S53: The action support apparatus 10 references the knowledge DB 19 by the input module 11, and determines the user's specific destination based on the detailed destinations corresponding to the specified general destination.

Step S54: The route generation engine 12 of the action support apparatus 10 interprets the current position as the starting point, and generates a planned route that links the starting point and the destination.

Steps S55, S56: The action support apparatus 10 reads the filtering rule in the filtering DB 112 by the inference engine 13 (S55), and selectively extracts recommended information by the inference engine 13 according to the filtering rule (S56).

Step S57: The action support apparatus 10 associates, by the inference engine 13, the planned route generated by the route generation engine 12 and the extracted recommended information, and outputs them onto the screen by the output module 14.

Step S58: The action support apparatus 10 judges by the inference engine 13 whether any of the recommended information has been selected.

Steps S59, S60: If any of the recommended information is selected, then the action support apparatus 10 confirms the intention of whether to add the selected recommended information as a new destination (S59). For example, if a user who is heading from Akashi to Nara has selected the restaurant "Mt. Ikoma" as the recommended information, then a screen (not shown) is output to the touch screen 23 that confirms whether to add the restaurant "Mt. Ikoma" as the destination (S59). If the addition of the destination is confirmed, then the route generation engine 12 generates a planned route that passes through the new destination, extracts recommended information, and associates and re-outputs the new planned route and the recommended information (S60).

If the destination is not added, then processing transitions to step S61.

Step S61: The action support apparatus 10 judges whether to terminate processing, e.g., whether to turn the power off. If processing terminates, then processing returns to the previously mentioned main processing. If processing does not terminate, then processing transitions to step S58, and repeats the previously discussed processing.

Steps S62, S63: The action support apparatus 10 receives the selection of the recommended information in the display screen of the recommended information, as previously discussed, as well as the specification of an arbitrary location or an arbitrary time on the planned route. If an arbitrary location or an arbitrary time on the route is specified (S62), then the inference engine 13 outputs the recommended information corresponding to the specified location and time (S63).

By repeating the previously mentioned steps S58 through S63, the user can output the recommended information on the planned route until arriving at the destination, change the route according to his or her liking, and so on.

Second Embodiment

Figure 14:
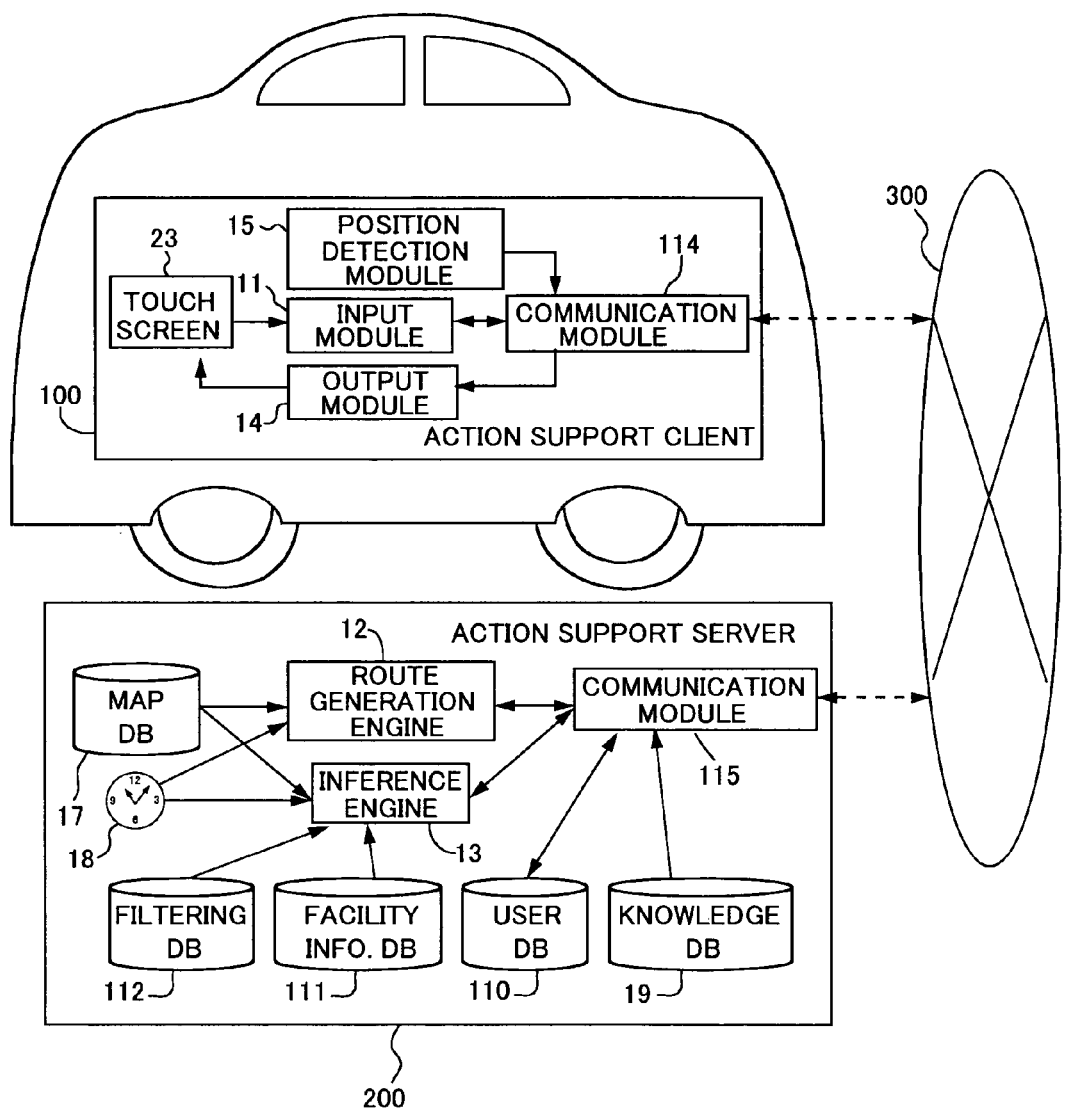
FIG. 14 is a block diagram of the action support system according to the second embodiment.

FIG. 14 is a block diagram of the entire action support system according to the second embodiment. The action support system includes an action support client 100, and an action support server 200. The action support client 100 operates on a portable computer. The action support server 200 operates on a computer that is connectable to the action support client 100, wirelessly and the like. Both are connected by a mobile communication network 300, and the like. As depicted in this figure, the action support system need not be embodied integrally on one computer. In FIG. 14, the action support system is embodied using two computers; however, it is also possible to embody the action support system using three or more computers by, for example, distributing the database across a plurality of computers.

The action support client 100 comprises the touch screen 23 as the input-output apparatus, the input module 11, the output module 14, the position detection module 15, and a communication module 114. In addition, the action support server 200 comprises the route generation engine 12, the inference engine 13, a communication module 115, the map DB 17, the internal clock 18, the knowledge DB 19, the user DB 110, the facility information DB 111, and the filtering DB 112. In the figure, elements having the same function as in the first embodiment are represented with the identical symbol.

The communication module 114 of the action support client 100 receives data from the action support server 200, and distributes the data to the input module 11 and the output module 14. In addition, conversely, the data from the input module 11 and the position detection module 15 is transmitted to the action support server 200. The communication module 115 of the action support server 200 delivers the data from the action support client 100 to the route generation engine 12 and the inference engine 13. In addition, conversely, the data from the route generation engine 12 and the inference engine 13 and the data read from each of the databases are transmitted to the action support client 100.

Thus, the processing load of the mobile computer can be reduced by distributing the action support system. As a result, the action support client 100 can be implemented without a high-performance computer, and can be implemented, for example, on a small computer that a person can always carry with them.

Other Embodiments (A) The user information is not limited to the example cited in the abovementioned first embodiment. For example, it is also acceptable to include the user's biological information, action history, and the like, in the user information. The biological information is information that describes the user's chronic illnesses, cautionary points from a health perspective, and so on. The following scenarios become possible if using the biological information. If biological information is stored to the effect that a user has "high blood pressure," then it becomes possible to extract restaurants that have a reduced salt menu or restaurants that take health into consideration. The action history is information that describes, for example, which facilities the user has visited in the past, the categories of facilities the user has visited in the past, what types of facilities they visited at around what times, and the like. If using the action history, then it is possible to select a destination having facilities that the user would probably like, to select as the recommended information facilities that the user would probably like, and the like.

(B) The rules that constitute the filtering rule are not limited to the example cited in the abovementioned first embodiment. For example, it is conceivable to extract the recommended information based on weather forecast data. The action support apparatus 10 and the action support server 200 acquire the weather forecast data from a Web site that provides weather forecast data, and, if the weather is clear, then extracts as the recommended information facility information for facilities where the activities are outdoors; and, if the weather is rainy, then extracts as the recommended information facility information for facilities that can be enjoyed indoors.

In addition, as a rule that anticipates the user's action, it is conceivable, for example, to anticipate the time when the user will go to a lavatory, and extract as the recommended information vicinity lavatory information as the user approaches the anticipated time.

(C) The scope of the present invention includes a program that executes the previously discussed method, and a computer readable storage media on which that program is recorded. Therein, the storage media can include a computer readable/writable floppy disk, a hard disc, semiconductor memory, a CD-ROM, a DVD, a magneto-optical disc (MO) and others.

INDUSTRIAL FIELD OF USE

If the present invention is used, then the action plan can be easily determined even if a user does not have a particularly clear purpose. In addition, the action plan can be flexibly modified in accordance with changes in the circumstances surrounding the user.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An action support method, comprising:
storing map information;
storing facility information;
receiving a specification of a destination by a user;
determining the destination of the user based on the specified destination;
generating a planned route that links the destination of the user determined by determining the destination, and a starting point;
receiving a specification of a position of a mark that is slidable by the user along an entire length of a virtual route;
searching facility information about facilities which are located in a vicinity of the planned route based on the map information, the planned route and the facility information;
determining facility information as recommended information to be presented to the user based on said searching;
receiving a specification of an arbitrary position on the planned route; and
determining the recommended information in accordance with the specified position, wherein
the virtual route is equivalent to the entire length of the planned route that links the starting point to the destination, and
based on a relative position of the mark with respect to the virtual route, said determining the recommended information in accordance with the specified position computes what location was specified on the planned route, and the recommended information is determined in accordance with the computed location.

2. The action support method as recited in claim 1, further comprising:
storing a destination table that associates a general destination and at least one specific destination that exists in the general destination,
wherein the selection of any general destination registered in the destination table is received in said receiving a specification; and the destination of the user is determined as any specific destination corresponding to the selected general destination.

3. The action support method as recited in claim 2, further comprising:
accumulating personal information of the user,
wherein the destination of the user is determined based on the user information.

4. The action support method as recited in claim 1, further comprising:
storing an information determination rule determining the recommended information,
wherein in addition to the map information and the planned route, recommended information to be presented to the user is extracted from the facility information based on the information determination rule and the facility information.

5. The action support method as recited in claim 1, further comprising:
outputting a portion or all of the recommended information associated with the planned route.

6. The action support method as recited in claim 5, wherein
the time of arrival at the facility specified by the recommended information or the time that the facility is used is outputted in said outputting, and is associated with both the recommended information and the planned route.

7. The action support method as recited in claim 1, wherein
a planned passage time that passes through the location on the planned route specified by the relative position of the mark with respect to the virtual route is further computed in said receiving the specification of the arbitrary position.

8. An action support method, comprising:
storing facility information;
displaying a virtual route equivalent to an entire length of a planned route that links a destination and a starting point of a user, and a mark that is slidable by the user along an entire length of the virtual route so that any position on the virtual route is specified;
receiving a specification of a position of the mark by the user;
searching facility information about facilities which are located in a vicinity of the planned route based on map information, the planned route and the facility information;
determining facility information as recommended information to be presented to the user based on said searching;
outputting recommended information corresponding to a location on the planned route equivalent to a relative position of the mark with respect to the virtual route;
receiving a specification of an arbitrary position on the planned route; and
determining the recommended information in accordance with the specified position, wherein
the virtual route is equivalent to the entire length of the planned route that links the starting point to the destination, and
based on a relative position of the mark with respect to the virtual route, said determining the recommended information in accordance with the specified position computes what location was specified on the planned route, and the recommended information is determined in accordance with the computed location.

9. The action support method as recited in claim 8, wherein
in addition to the virtual route equivalent to the entire length of the planned route that links from the starting point to the destination, and the mark that is slidable along the entire length of the virtual route, a planned passage time when the user will pass through the location on the planned route is also displayed in said displaying the virtual route.

10. An action support program that causes a computer to execute:
storing map information;
storing facility information;
receiving a specification of a destination by a user;
determining the destination of the user based on the specified destination;
generating a planned route that links the determined destination of the user, and a starting point;
receiving a specification of a position of a mark that is slidable by the user along an entire length of a virtual route;
searching facility information about facilities which are located in a vicinity of the planned route based on the map information, the planned route and the facility information;
determining facility information as recommended information to be presented to the user based on said searching;
receiving a specification of an arbitrary position on the planned route; and
determining the recommended information in accordance with the specified position, wherein
the virtual route is equivalent to the entire length of the planned route that links the starting point to the destination, and
based on a relative position of the mark with respect to the virtual route, said determining the recommended information in accordance with the specified position computes what location was specified on the planned route, and the recommended information is determined in accordance with the computed location.

11. An action support apparatus, comprising:
a map storing unit that stores map information;
a facility information storing unit storing facility information;
a destination specifying unit that receives a specification of a destination by a user;
a destination determining unit that determines the destination of the user based on the specified destination;
a planned route generating unit that generates the planned route that links the determined destination of the user, and the starting point;
a receiving unit that receives a specification of a position of a mark that is slidable by the user along an entire length of a virtual route;
a searching unit that searches facility information about facilities which are located in a vicinity of the planned route based on the map information, the planned route and the facility information;
an information determining unit that determines the facility information as recommended information to be presented to the user based on said searching;
a receiving unit that receives a specification of an arbitrary position on the planned route; and a determining unit that determines the recommended information in accordance with the specified position, wherein the virtual route is equivalent to the entire length of the planned route that links the starting point to the destination, and based on a relative position of the mark with respect to the virtual route, said determining unit computes what location was specified on the planned route, and the recommended information is determined in accordance with the computed location.

* * * * *